US009787955B2

(12) United States Patent
Hamada et al.

(10) Patent No.: US 9,787,955 B2
(45) Date of Patent: Oct. 10, 2017

(54) MULTI-PROJECTION DEVICE COMBINING A PLURALITY OF IMAGES TO FORM A SINGLE IMAGE

(71) Applicant: KRIPTON CO., LTD., Tokyo (JP)

(72) Inventors: Masahisa Hamada, Tokyo (JP); Shohei Nakamura, Tokyo (JP)

(73) Assignee: KRIPTON CO., LTD., Tokyo (JP)

( * ) Notice: Subject to any disclaimer, the term of this patent is extended or adjusted under 35 U.S.C. 154(b) by 0 days.

(21) Appl. No.: 15/027,354

(22) PCT Filed: Jul. 29, 2015

(86) PCT No.: PCT/JP2015/071449
§ 371 (c)(1),
(2) Date: Apr. 5, 2016

(87) PCT Pub. No.: WO2016/017666
PCT Pub. Date: Feb. 4, 2016

(65) Prior Publication Data
US 2016/0255312 A1 Sep. 1, 2016

(30) Foreign Application Priority Data

Jul. 30, 2014 (JP) ................................. 2014-155138

(51) Int. Cl.
*H04N 9/31* (2006.01)
*G03B 21/14* (2006.01)
(Continued)

(52) U.S. Cl.
CPC ........... *H04N 9/3147* (2013.01); *G02B 5/205* (2013.01); *G03B 21/13* (2013.01); *G03B 21/142* (2013.01);
(Continued)

(58) Field of Classification Search
CPC .... G03B 21/28; G03B 21/142; G03B 21/208; G03B 21/2066; H04N 9/315; H04N 9/31;
(Continued)

(56) References Cited

U.S. PATENT DOCUMENTS

| 2004/0141157 A1* | 7/2004 | Ramachandran | ...... G02B 17/06 353/70 |
| 2005/0179871 A1* | 8/2005 | Kobayashi | ............. G02B 5/005 353/31 |

(Continued)

FOREIGN PATENT DOCUMENTS

| JP | H11-306836 A | 11/1999 |
| JP | 2002-148713 | * 5/2002 |

(Continued)

OTHER PUBLICATIONS

International Search Report; PCT/JP2015/071449 dated Oct. 20, 2015.

*Primary Examiner* — Sultan Chowdhury
(74) *Attorney, Agent, or Firm* — Studebaker & Brackett PC

(57) ABSTRACT

In a multi-projection device, each of the projectors comprises a light shielding plate. The light shielding plate has an end formed into a sawtooth shape and is also provided with a gradation coated part which is coated such that white-light transmittance gradually decreases in the direction away from the end.

3 Claims, 4 Drawing Sheets

(51) Int. Cl.
*H04N 5/74* (2006.01)
*G02B 5/20* (2006.01)
*G03B 21/13* (2006.01)
*G02B 7/00* (2006.01)
*G02B 19/00* (2006.01)
*G02B 27/28* (2006.01)

(52) U.S. Cl.
CPC ............ *H04N 5/74* (2013.01); *H04N 9/3102* (2013.01); *G02B 7/003* (2013.01); *G02B 7/006* (2013.01); *G02B 19/0009* (2013.01); *G02B 27/283* (2013.01)

(58) Field of Classification Search
CPC .. H04N 9/3152; H04N 9/3167; G02B 27/102; G02B 27/126; G02B 27/149; G02B 27/005; G02B 27/3058
See application file for complete search history.

(56) References Cited

U.S. PATENT DOCUMENTS

| | | |
|---|---|---|
| 2006/0203210 A1 | 9/2006 | Shirasu et al. |
| 2007/0206163 A1* | 9/2007 | Kuroda ................ G03B 21/145 353/88 |
| 2007/0285780 A1 | 12/2007 | Imafuku et al. |
| 2009/0009730 A1* | 1/2009 | Destain ................ G03B 21/28 353/84 |

FOREIGN PATENT DOCUMENTS

| | | |
|---|---|---|
| JP | 2002-328331 A | 11/2002 |
| JP | 3737029 B2 | 1/2006 |
| JP | 2006-106364 A | 4/2006 |
| JP | 2006-251333 A | 9/2006 |
| JP | 2007-328130 A | 12/2007 |

* cited by examiner

MULTI-PROJECTION DEVICE COMBINING A PLURALITY OF IMAGES TO FORM A SINGLE IMAGE

TECHNICAL FIELD

The present invention relates to a multi-projection device which projects, onto a screen, images from a plurality of projectors and combines the plurality of projected images so as to form a single image.

BACKGROUND ART

In the case of forming an image on a large-scale screen of a movie theater, a planetarium, etc., when attempting to project a single image over the entire screen by means of a single projector, extremely high performance is required for such projector, leading to high cost. Thus, a multi-projection device which projects, onto a screen, images by means of a plurality of projectors and combines the plurality of projected images at their ends so as to form a single large image has been proposed. In such multi-projection device, in order to prevent a border line from appearing in the part where a plurality of images are combined, having the ends of images overlap one another has generally been employed.

However, when combining projected images with their ends being made to overlap one another, this will invite a new problem in that the combined part has a higher image brightness than that of the surroundings, which gives a viewer a feeling of discomfort. Therefore, a measure to arrange a light shielding plate in front of a projection lens of each of the projectors so as to cause the brightness of such combined part to be equal to that of the surroundings has been employed. Such light shielding plate attenuates the brightness of the end of an image projected from each of the projectors, thereby adjusting the image brightness of the combined part so as to be substantially equal to that of the surroundings.

The arrangement of such light shielding plate can prevent the combined part of images from having an extremely high brightness. However, it is difficult for the light shielding plate to completely control the traveling of light projected from a projector, and this has led to a further new problem. That is, the light projected from a projector is diffracted by the light shielding plate, which does not allow for smooth attenuation of the brightness at the end of an image, resulting in the appearance of a striped, high brightness part around the combined part.

The light shielding plate disclosed in Japanese Patent No. 3,737,029 is known to solve the above problem. Such light shielding plate is formed by laminating a large number of thin-plate filters. Each of the filters has an end formed into a sawtooth shape comprised of isosceles triangles placed in a line.

Further, such light shielding plate is configured such that white-light transmittance decreases in a stepwise manner in the direction away from the sawtooth-shaped ends. In further detail, such many filters are arranged with their ends being shifted from one another, so that the filters are laminated such that the light shielding plate has an increasing thickness in the direction away from the sawtooth-shaped ends. Therefore, the light shielding plate is configured to have a lower white-light transmittance at a location thereof where a larger number of filters are laminated.

The employment of the above-described light shielding plate which has sawtooth-shaped ends and which has a decreasing white-light transmittance in the direction away from such ends achieves smooth attenuation of the brightness at the end of an image, and this can reduce the striped, high brightness part which would otherwise appear in the combined part.

SUMMARY

Technical Problem

A condenser lens comprised of a group of lenses arranged in a grid pattern is provided inside a projector. The light from such projector to be projected onto a screen passes through such condensing lens before being projected, and is thus imparted with transient characteristics (distortion). The degree of such transient characteristics obviously varies depending on the projector type and also involves individual variability even among the same type of projectors.

In the light shielding plate disclosed in Japanese Patent No. 3,737,029, a large number of filters have ends which are each formed into a sawtooth shape, and thus, such light shielding plate has an end having a large number of edges. When the above-described light having been imparted with various transient characteristics is incident thereon, light scattering and spectral diffraction will occur at such large number of edges. Therefore, depending on the projector, the light shielding plate disclosed in Japanese Patent No. 3,737,029 has sometimes failed to sufficiently solve the problem of a striped, high brightness part appearing in a projected image.

The present invention has been made in light of the above problem and has an object to provide a multi-projection device which prevents high brightness from appearing not only in a combined part of images projected from a plurality of projectors but also in the surroundings.

Solution to Problem

In order to solve the above problem, the present invention provides a multi-projection device which projects images, from a plurality of projectors, onto a screen, and combines the plurality of projected images so as to form a single image, each of the projectors comprising: a transmission unit which transmits an image signal; a condenser lens which includes a group of lenses arranged in a grid pattern, and which allows light emitted from a light source lamp to be incident thereon and emits the light, as a uniform light beam, to the outside; a polarization beam splitter which allows the uniform light beam emitted from the condenser lens to be incident thereon and reflects the uniform light beam; an image generation unit which receives the image signal to convert the image signal to image light, and which allows the uniform light beam reflected by the polarization beam splitter to be incident thereon so as to optically modulate, through the image light, the uniform light beam and reflects the optically modulated light beam, as high-brightness image light, toward the polarization beam splitter; a projection lens which allows the high-brightness image light transmitted through the polarization beam splitter to be incident thereon and projects the high-brightness image light, as projection light, onto the screen; and a light shielding plate which is arranged in front of the projection lens and an end of which is arranged in an optical path of the projection light so as to adjust a brightness of a combined part of the plurality of images, wherein the light shielding plate has the end formed into a sawtooth shape and is also provided with a gradation coated part coated such that white-light transmittance gradually decreases in a direction away from the end.

In the present invention, the light shielding plate has an end formed into a sawtooth shape and is also provided with a gradation coated part coated such that white-light transmittance gradually decreases in the direction away from the end. Therefore, the light shielding plate according to the present invention enables the transmittance to vary smoothly by way of coating, compared with a conventional light shielding plate in which a large number of filters are laminated so as to decrease the white-light transmittance in a stepwise manner. Further, there is no need to laminate, at the end of the light shielding plate, a large number of filters in order to gradually decrease the white-light transmittance, and thus, it becomes possible to reduce the number of edges formed due to the sawtooth shape. This can prevent light scattering and spectral diffraction from occurring due to such edges.

Therefore, according to the present invention, the transmittance is made to vary smoothly in the direction away from the end, and light scattering and spectral diffraction are prevented from occurring at the end, whereby the brightness of the combined part of an image projected from the projector and the brightness of the surroundings can be prevented from being increased.

Further, in the multi-projection device according to the present invention, it is preferable for the light shielding plate to be configured by laminating a plurality of thin-plate filters and for the gradation coated part to be provided between the laminated filters.

According to such preferred aspect, the gradation coated part is provided between the laminated filters, and thus, the gradation coated part can be protected by the filters, thereby allowing for the exertion of more stable performance.

Further, the multi-projection device according to the present invention is preferably provided with a curve adjusting mechanism which deforms the light shielding plate so as to curve the end and adjusts a degree of the curve.

According to such preferred aspect, curving of the end of the light shielding plate makes it possible to deform the end into an arc shape when seen from the projection lens of the projector. Therefore, even when the end of the optical path is curved into an arc shape due to the characteristics of the projection lens, the end of the light shielding plate can still be curved so as to fit such arc shape.

Further, the multi-projection device according to the present invention is preferably provided with a position adjusting mechanism which adjusts a position of the light shielding plate with respect to the projection lens.

According to such preferred aspect, the distance between the projection lens and the light shielding plate and the positional relationship therebetween are adjusted, thereby allowing for the adjustment of the overlap width of images. Further, the end of the light shielding plate can reliably be made to fit a curved part of the end of the optical path of the light projected from the projection lens.

DESCRIPTION OF EMBODIMENTS

Figure 1:
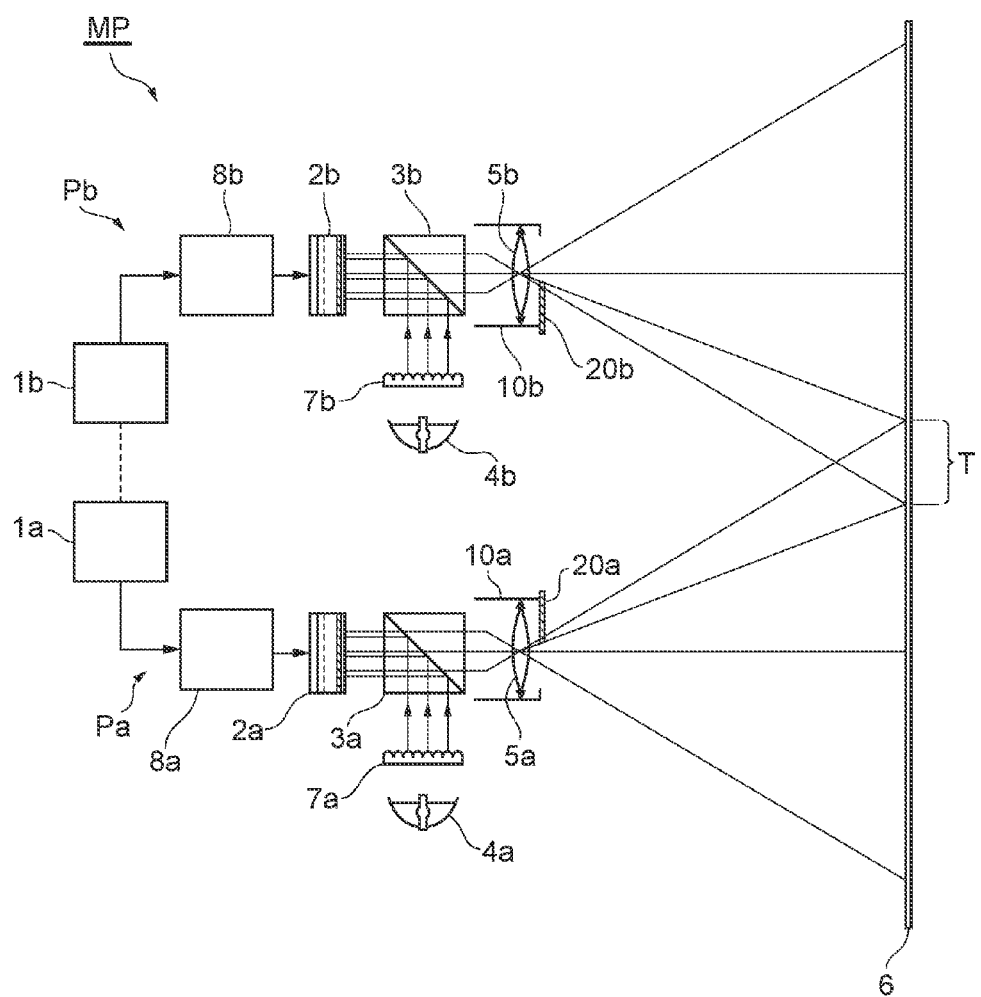
FIG. 1 is a schematic diagram illustrating a configuration of a multi-projection device according to an embodiment of the present invention.

Embodiments of the present invention will now be described below with reference to the accompanying drawings. To facilitate understanding of the description, the same components in the respective drawings are denoted by the same reference numerals whenever possible, and repetitive description thereof will be omitted.

Firstly, explanation will be made regarding a multi-projection device according to an embodiment of the present invention with reference to FIG. 1. FIG. 1 is a schematic diagram illustrating a configuration of a multi-projection device according to an embodiment of the present invention.

A multi-projection device MP comprises two projectors Pa, Pb. The projectors Pa, Pb are arranged so as to be adjacent to each other in the horizontal direction and are also each arranged so as to face a planar screen 6. Images projected from the projectors Pa, Pb are combined such that ends of such images overlap one another on the screen 6 (a combined part T).

The projectors Pa, Pb respectively include: video reproducers 1a, 1b; pixel control units 8a, 8b; image-generation laminated plates 2a, 2b; polarization beam splitters 3a, 3b; light source lamps 4a, 4b; projection lenses 5a, 5b; condenser lenses 7a, 7b; lens holders 10a, 10b; and light shielding plates 20a, 20b. The projectors Pa, Pb share a basic configuration, and thus, explanation thereof will be made below, taking the projector Pa, as an example.

The video reproducer 1a is a VTR, etc. and is a device which generates and transmits image signals. Image signals transmitted by the video reproducer 1a correspond to the part, on the right side of the screen 6, of an image projected onto the screen 6. The video reproducer 1a is electrically connected to the video reproducer 1b of the projector Pb. Thus, the video reproducer 1a sequentially generates and transmits image signals of an image projected onto the screen 6, in synchronization with the video reproducer 1b, which generates and transmits image signals corresponding to the left-side part of such image projected onto the screen 6.

The image-generation laminated plate 2a is a device which receives an image signal transmitted from the video reproducer 1a via the pixel control unit 8a and then converts such image signal to image light. Such image light composed of color light beams is subjected to amplification control and then emitted to the outside.

The light source lamp 4a is a xenon lamp which emits light with high directivity. The condenser lens 7a is arranged on an optical path of light emitted from the light source lamp 4a. The condenser lens 7a is comprised of a group of lenses arranged in a grid pattern. Each of the lenses allows light emitted from the light source lamp 4a to be incident thereon and emits such light, as a uniform light beam, to the outside. The waves of white light emitted from the condenser lens 7a in this way are synchronized and coherent waves.

The polarization beam splitter 3a is arranged so as to allow the image light emitted from the image-generation laminated plate 2a to be incident thereon. Simultaneously, the polarization beam splitter 3a allows high-brightness white light emitted from the condenser lens 7a to be incident thereon. The polarization beam splitter 3a allows such light emitted from the condenser lens 7a to be incident thereon in the direction which makes an angle of 90 degrees with the image-generation laminated plate 2a. The white light that has been emitted from the condenser lens 7 and allowed to be incident on the polarization beam splitter 3a is reflected toward the image-generation laminated plate 2a.

The white light which has been emitted from the condenser lens 7a, reflected off the polarization beam splitter 3a and allowed to be incident on the image-generation laminated plate 2a is optically modulated, through image signals, by the image-generation laminated plate 2a, and is then reflected toward the polarization beam splitter 3a. The resultant light is again allowed to be incident on the polarization beam splitter 3a and is subjected to RGB color combination in the polarization beam splitter 3a. The resultant light is then emitted, as image light having an extremely high brightness and being comprised of the color light beams (high-brightness image light), to the outside.

The projection lens 5a is arranged so as to allow the high-brightness image light emitted from the polarization beam splitter 3a to be incident thereon. The projection lens 5a is a double-sided convex lens held by a lens holder 10a. The projection lens 5a refracts incident high-brightness image light and projects, onto the screen 6 at a great distance, image light expanded in proportion to the distance. Focusing of the image projected onto the screen 6 can be performed by moving the projection lens 5a together with the lens holder 10a in the optical axis direction.

Figure 2:
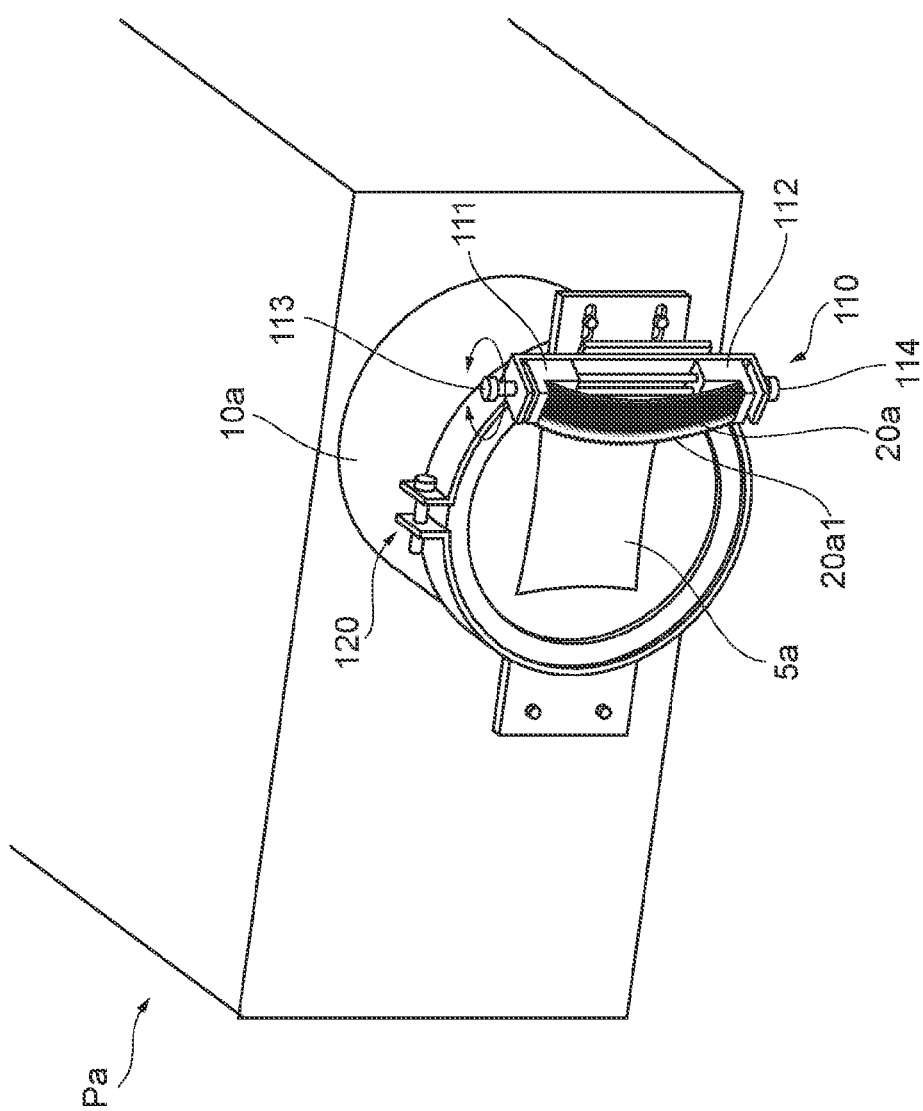
FIG. 2 is a perspective view illustrating the state in which a light shielding plate is attached to a projector.

Explanation will now be made regarding the outline of a light shielding plate used in a multi-projection device according to an embodiment of the present invention with reference to FIG. 2. FIG. 2 is a perspective view illustrating the state in which a light shielding plate is attached to a projector.

The light shielding plate 20a is arranged in front of the projection lens 5a. As described below, the light shielding plate 20a is entirely formed into a thin-plate shape, and an upper and a lower end thereof are held by a curve adjusting mechanism 110. In further detail, the light shielding plate 20a is fixed by being sandwiched, in the vertical direction, by claws 111, 112 of the curve adjusting mechanism 110. The light shielding plate 20a has flexibility, is deformed by being compressed by the claws 111, 112 in the vertical direction, and is fixed in the state of being curved so as to have a convex shape in the direction in which the projection lens 5a projects light. The claws 111, 112 are configured so as to be close to or separate from each other by fastening or loosing set screws 113, 114. Therefore, the amount of fastening of the set screws 113, 114 is adjusted, whereby the degree of curve of the light shielding plate 20a can be adjusted appropriately.

The curve adjusting mechanism 110 holds the light shielding plate 20a such that the light shielding plate 20a is arranged so as to be inclined with respect to a lens surface of the projection lens 5a. Therefore, an end 20a1 of the light shielding plate 20a, which is curved and arranged in an inclined manner, has an arc shape when seen from the front of the projection lens 5a.

The curve adjusting mechanism 110 is fixed to the lens holder 10a of the projector Pa by means of a position adjusting mechanism 120. The lens holder 10a has a cylindrical shape and is formed so as to protrude in the direction in which the projection lens 5a projects light, and the position adjusting mechanism 120 is fixed to a circumferential part of the lens holder 10a. The position adjusting mechanism 120 is configured so as to change the position of the light shielding plate 20a through its rotation in the circumferential direction of the lens holder 10a and so as to be capable of being fixed to the lens holder 10a at an arbitrary position.

Figure 3A:
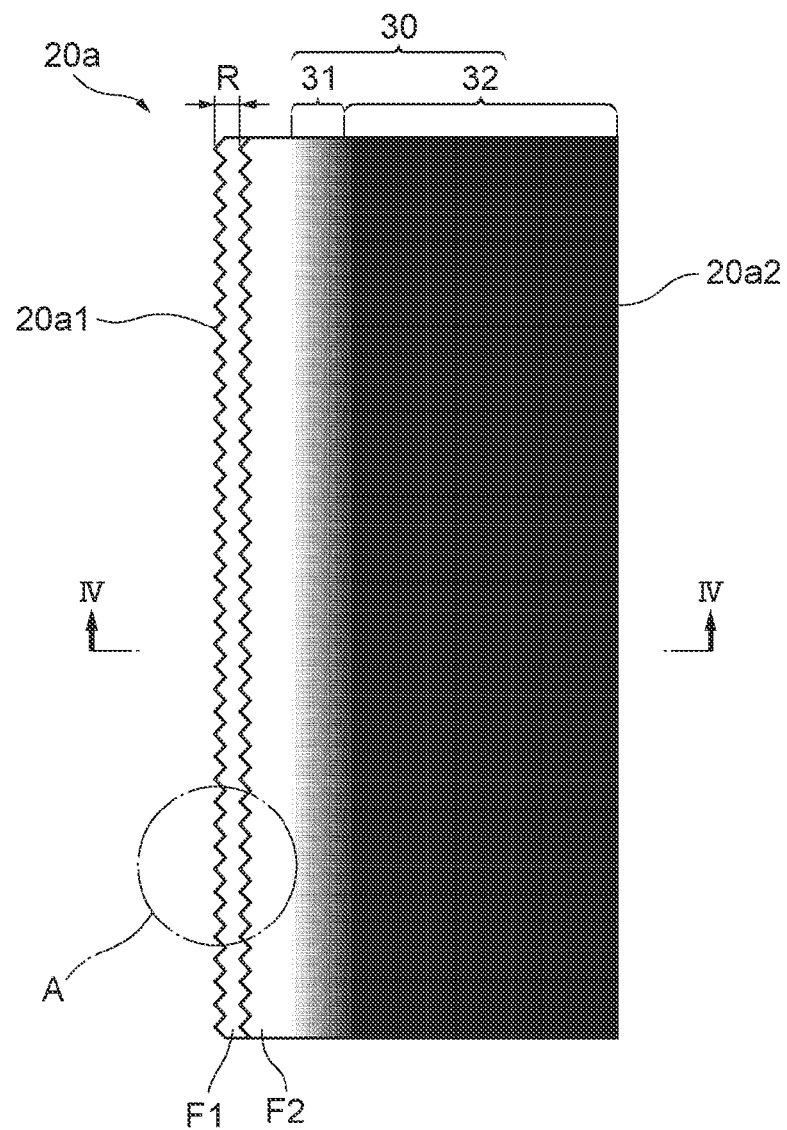
FIG. 3A and FIG. 3B are front views illustrating the light shielding plate.
Figure 3B:
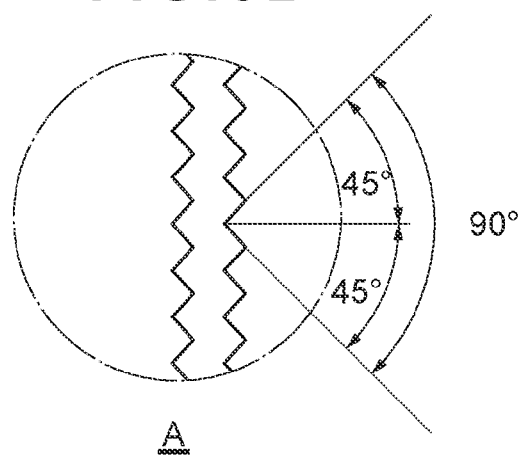
Figure 4:
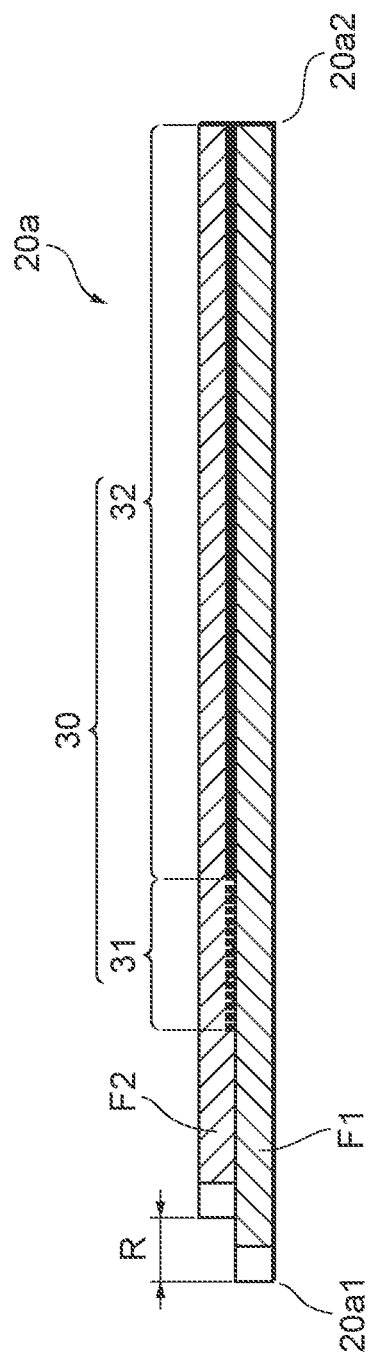
FIG. 4 is a cross-sectional view illustrating a cross-section taken along line IV-IV of FIG. 3A.

Next, referring to FIGS. 3A, 3B and 4, explanation will be made regarding the details of a light shielding plate used in a multi-projection device according to an embodiment of the present invention. FIG. 3A and FIG. 3B are front views illustrating a light shielding plate. FIG. 4 is a cross-sectional view illustrating a cross-section taken along line IV-IV of FIG. 3A.

The light shielding plate 20a is configured by bonding, through adhesion, and laminating two filters F1, F2, each having a rectangular thin-plate shape. The filters F1, F2 are each formed of a resin which is colorless and transparent and which has high white-light transmittance. Further, the filters F1, F2 are laminated with the ends thereof being shifted from each other by a width R.

Ends of the filters F1, F2 which are close to the end 20a1 of the light shielding plate 20a are each formed into a sawtooth shape comprised of isosceles triangles placed in a line. The filters F1, F2 have the same pitch of tips of the sawtooth shape, and each of such tips is set so as to be at an angle of approximately 90 degrees (±45).

A coated part 30 is provided between the filters F1, F2 and is located so as to be separate, by a predetermined width, from the end 20a1 of the light shielding plate 20a. The coated part 30 comprises a black coating which is coated onto the filter F1 before the filters F1, F2 are laminated. Various examples of the coating method to be employed include evaporation and printing with an inkjet printer. FIG. 4 shows the thickness of the coated part 30 which has been slightly magnified for explanation; however, the coated part 30 is actually thin such that the coated part 30 is hardly seen in the cross-sectional view. The coated part 30 comprises a gradation coated part 31 and an opaque coated part 32.

The gradation coated part 31 is provided at a part of the coated part 30 which is close to the end 20a1 of the light shielding plate 20a. The gradation coated part 31 has been coated with a coating such that the color gradually becomes denser from the end 20a1 of the light shielding plate 20a toward an end 20a2, which is opposed to the end 20a1. That is, in the gradation coated part 31, the color concentration is set so as to be gradually higher in the direction away from the end 20a1. Thus, the gradation coated part 31 has a higher white-light transmittance at the part closer to the end 20a1 and a lower white-light transmittance at the part closer to the end 20a2.

The opaque coated part 32 is provided at a part closer to the end 20a2 of the light shielding plate 20a than the gradation coated part 31. The opaque coated part 32 is coated with a black coating which is extremely dense so as to hardly transmit any white light.

As to the light shielding plate 20 configured as above, the end 21a is arranged in an optical path of projection light projected from the projection lens 5a. This smoothly attenuates the brightness of the projection light which is projected from the projection lens 5a and directed toward the combined part T on the screen 6, thereby allowing for appropriate brightness at the combined part T.

In the multi-projection device MP, the light shielding plate 20a has the end 20a1 formed into a sawtooth shape and is also provided with the gradation coated part 31 coated such that the white-light transmittance gradually decreases in the direction away from the end 20a1. Therefore, the light shielding plate 20a enables the transmittance to vary smoothly by way of coating, compared with a conventional light shielding plate in which a large number of filters are laminated so as to decrease the white-light transmittance in a stepwise manner.

Further, there is no need to laminate, at the end 20a1 of the light shielding plate 20a, a large number of filters in order to gradually decrease the white-light transmittance, and thus, it becomes possible to reduce the number of edges formed due to the sawtooth shape of the end of each of the filters. This can prevent light scattering and spectral diffraction from occurring due to such edges.

Therefore, with the multi-projection device MP according to the present embodiment, the transmittance is made to vary smoothly in the direction away from the end 20a1, and light scattering and spectral diffraction are prevented from occurring at the end 20a1, whereby the brightness of the combined part T of an image projected from the projector Pa and the brightness of the surroundings can be prevented from being increased.

Further, the light shielding plate 20a is configured by laminating the thin-plate filters F1, F2, and the gradation coated part 31 is provided between the laminated filters F1, F2, and thus, the gradation coated part 31 can be protected by the filters F1, F2, thereby allowing for the exertion of more stable performance.

Moreover, the light shielding plate 20a is deformed so as to curve the end 20a1, and the curve adjusting mechanism 110 for adjusting the curve degree is provided, whereby such curving of the end 20a1 of the light shielding plate 20a makes it possible to deform the end 20a1 into an arc shape when seen from the projection lens 5a of the projector Pa. Therefore, even when the end of the optical path is curved into an arc shape due to the characteristics of the projection lens 5a, the end 20a1 of the light shielding plate 20a can still be curved so as to fit such arc shape.

Furthermore, the position adjusting mechanism 120 for adjusting the position of the light shielding plate 20a with respect to the projection lens 5a is provided, whereby the distance between the projection lens 5a and the light shielding plate 20a and the positional relationship therebetween are adjusted, thereby allowing for the adjustment of the width of the combined part T. Further, the end 20a1 of the light shielding plate 20 can reliably be made to fit a curved part of the end of the optical path of the light projected from the projection lens 5a.

Embodiments of the present invention have been described above with reference to concrete examples. However, the present invention is not limited to these examples. That is, when those skilled in the art make design changes to any of the examples, the resulting variations are also included in the scope of the present invention as long as the variations contain the features of the present invention. For example, the components of the above-described examples, as well as the arrangements, materials, conditions, shapes, sizes, and the like of the components, are not limited to those illustrated above, and may be changed as required. Further, the components of the above-described embodiments may be combined as long as it is technically possible, and the resulting combinations are also included within the scope of the present invention, as long as the combinations contain the features of the present invention.

What is claimed is:

1. A multi-projection device which projects images, from a plurality of projectors, onto a screen, and combines the plurality of projected images so as to form a single image, each of the projectors comprising:
   a transmission unit which transmits an image signal;
   a condenser lens which includes a group of lenses arranged in a grid pattern, and which allows light emitted from a light source lamp to be incident thereon and emits the light, as a uniform light beam, to the outside;
   a polarization beam splitter which allows the uniform light beam emitted from the condenser lens to be incident thereon and reflects the uniform light beam;
   an image generation unit which receives the image signal to convert the image signal to image light, and which allows the uniform light beam reflected by the polarization beam splitter to be incident thereon so as to optically modulate, through the image light, the uniform light beam and reflects the optically modulated light beam, as high-brightness image light, toward the polarization beam splitter;
   a projection lens which allows the high-brightness image light transmitted through the polarization beam splitter to be incident thereon and projects the high-brightness image light, as projection light, onto the screen; and
   a light shielding plate which is arranged in front of the projection lens and an end of which is arranged in an optical path of the projection light so as to adjust a brightness of a combined part of the plurality of images,
   wherein the light shielding plate has the end formed into a sawtooth shape and is also provided with a gradation coated part coated such that white-light transmittance gradually decreases in a direction away from the end, and
   the light shielding plate is configured by laminating a plurality of thin-plate filters, and the gradation coated part is provided between the laminated filters.

2. The multi-projection device according to claim 1, wherein the multi-projection device is provided with a curve adjusting mechanism which deforms the light shielding plate so as to curve the end and adjusts a degree of the curve.

3. The multi-projection device according to claim 2, wherein the multi-projection device is provided with a position adjusting mechanism which adjusts a position of the light shielding plate with respect to the projection lens.

* * * * *